Patented Apr. 6, 1937

2,076,517

UNITED STATES PATENT OFFICE 2,076,517

MANUFACTURE OF ABRASIVE ARTICLES

Norman P. Robie, Washington, D. C., assignor, by mesne assignments, to The Carborundum Company, Niagara Falls, N. Y., a corporation of Delaware No Drawing. Application July 11, 1931, Serial No. 550,269. In Canada June 28, 1929

16 Claims. (Cl. 51—280)

This application is a continuation in part of my copending application Serial No. 315,603 filed October 27, 1928.

This invention relates in general to an abrasive article comprising abrasive particles, such as silicon carbide, aluminum oxide, etc., bonded with resinous materials.

In the manufacture of synthetic resin bonded wheels one method of procedure has been to mix the abrasive with dry powdered resins (potentially reactive resins where, for example, they contain the necessary proportion of methylene component to harden them under heat). The mixture is then plasticized with a reactive aldehyde, such as furfural, benzaldehyde, etc., and pressed at room temperature. By a plasticizer in this connection we mean particularly a solvent which does not completely evaporate and which leaves the bond plastic while the mixture is being worked in the mold. The process is completed by pressing the mixture in a mold at high pressure, removing the article from the mold and baking it at a temperature which will harden the binder.

I have found that cold molded abrasive wheels may be made without the reactive aldehyde or other solvent. The process consists in general of mixing the abrasive particles with a liquid reactive resin and then reducing the stickiness of the mixture by adding dry powdered fillers or resins, such as "Redmanol" or other synthetic resins. The proportion of liquid hardening resin to dry hardening resins is so adjusted that the mix consists of thoroughly coated grains in a loose dry condition neither sticky nor gummy. I prefer the mix in this form as it is easier to distribute in the molds to produce uniform wheels.

Example I.—As an example of our process, we have made 36 grit fused alumina wheels containing 9% phenol condensation products as follows: 1820 parts of 36 grit fused alumina were thoroughly mixed with 38 parts of a liquid phenolic condensation product resin in the so-called A stage, 130 parts of a dry powdered solid B stage phenolic condensation resin were then mixed in. The A stage material is a liquid resin, without solvent, resulting from the discontinuance of the reaction before it has proceeded to the point of solidification. The mix was screened one or more times to break up any lumps not broken by the mixer. The mix was then distributed in molds by sifting or stirring and then leveling. The articles were cold pressed at pressures from 1500 to 2500 pounds per square inch. The articles were cured by supporting them on an iron base sprinkled with sand and by slowly heating them to 350° Fahr. The cured articles had a tensile strength of 1952 pounds per square inch.

The use of liquid resin in immediate contact with the abrasive grain at the beginning of the process promotes good adhesion between the bond and abrasive because all of the liquid resin is converted to a solid whereas with dissolved resins part of the solution, namely, the solvent is removed during the heat treatment. The use of liquid resin alone as a bond is not suitable as the mixture would be too gummy and sticky to work easily. The addition of dry resins and fillers reduces the stickiness of the mix until it consists of individual grains thoroughly coated with bond. When the proportion of liquid bond is suitably adjusted, there will be no loose dry bond, due to the adhesive nature of the liquid bond. The adhesive liquid resin also acts as a temporary binder between the curing and pressing stages.

The application of heat to the molded article is continued until the bond has become hard, which, under the conditions described in the example given above, would require holding the articles at the temperature of 350° Fahr. for a period of about 12 hours. Under these conditions, it will be found that the dry "B stage" resin will have gone over into the so-called "C stage" while what was originally the liquid "A stage" product will have solidified and become what is commonly described as "B stage". In other words, the cured article will contain two or more resins with different degrees of cure or polymerization, obtained by using in the original mix resins in different stages of polymerization and curing them together.

Example II.—1820 grams of 36 grit fused alumina abrasive grain were thoroughly mixed with 45 cubic centimeters of the liquid phenolic condensation product of Example I and to the moistened grain was added 130 grams of the polyhydric alcohol-polybasic acid resin sold to the trade as "#1350 Glytal". The dry resin was then mixed, molded, pressed and cured as described in Example I. In this case, the article consisted of abrasive grains cemented to the "Glytal" resin binder with a "B stage" phenolic resin bonding material.

Example III.—The "B stage" powdered resin of Example I was replaced by the same amount of powdered resin in the "A stage". When cured, this article consisted of abrasive granules bonded by a substantially homogeneous phenolic resin in the "B stage".

Other modifications of my process than those given in the preceding examples may be used. The following variations are possible.

2,076,517

1. Other liquid reactive heat-hardenable resins (such as those produced by phenol and furfural or urea and its derivatives with aldehydes or solutions of solid resins in liquid resins of either the same or a different type) may be substituted for the liquid phenolic condensation product resin.

2. Other dry powdered heat hardenable resins such as those produced by the partial reaction of phenolic bodies with aldehydes or aldehyde derivatives, urea and its derivatives with aldehydes, and many other synthetic resins, either singly or as mixtures of two or more suitable types, may be substituted for the dry powdered phenolic condensation product resin.

3. Inert fillers such as graphite, flint, clay, abrasive powders, etc., or organic fillers such as pitch, rosin, shellac, powdered plastic waste, cellulose acetate, and natural and synthetic gums may be mixed with the dry powdered hardenable resin to modify its properties as desired or may be used without the dry reactive resin.

4. Other abrasives, such as emery, garnet, flint, corundum and silicon carbide may be used.

5. The amount of bond may be varied. The correct proportion of liquid bonding material to solid bonding material must be determined for each percent of total bond to obtain the right consistency.

My process has a number of advantages:
1. The mix as given in the example above contains no volatile solvent to be adjusted for weather conditions.
2. The absence of volatile solvents and volatile plasticizers tends to prevent the articles from boiling during the curing period.
3. The process does away with the extra added cost of volatile solvents and volatile plasticizers.
4. The liquid resin bond promotes firm adhesion between the bond and abrasive.
5. The mix is not difficult to distribute in molds, on account of the distributed condition of the coated grains. In other words, the mixture can be easily poured.

I claim:

1. In the manufacture of an abrasive article the steps of the process comprising mixing the abrasive grains with a liquid reactive resin, adding dry powdered reactive resin to make the mixture workable, forming the article under pressure, and hardening the bond by heating.

2. A moldable and heat hardenable abrasive mixture comprising abrasive granules coated with a potentially reactive liquid resin, and a finely divided solid and potentially reactive resin.

3. An abrasive article comprising abrasive granules, a urea-condensation product bonding material adhering to the surface of the granules and a phenolic condensation product binder adhering to said bonding material.

4. The process of making an abrasive article which comprises wetting abrasive grains with liquid phenol condensation product resin, coating said wetted grains with dry powdered potentially reactive phenol condensation product resin and hence reducing the stickiness of the mix, forming the mixture under pressure into the shape of an article, and heating the formed mixture to rigidify the two resinous phases.

5. An abrasive article of the character obtainable by wetting abrasive grains with liquid phenol condensation product resin, coating said wetted grains with dry powdered potentially reactive phenol condensation product resin and hence reducing the stickiness of the mix, forming the mixture under pressure into the shape of an article, and heating the formed mixture to rigidify the two resinous phases.

6. In the manufacture of abrasive articles, the steps which comprise mixing abrasive grain with a liquid heat-hardening phenolic condensation product resin so as to wet the grain, then mixing the thus wetted grain with a dry powdered heat-hardening resinous partial reaction product of a phenol body and a compound of the group composed of aldehydes and aldehyde derivatives so as to coat the wet abrasive grains with the dry powdered resin, the liquid and dry resins being so proportioned as to give a substantially dry loose abrasive mix, forming the article under pressure from such mix, and hardening the resinous bond by heating.

7. In the manufacture of abrasive articles, the steps comprising mixing abrasive grain with a liquid reactive heat-hardening resin so as to wet the grain, then mixing the thus wetted grain with a dry powdered heat-hardening reactive resin in an amount sufficient to coat the wet abrasive grains and form a substantially dry loose easily pourable abrasive mix, forming the article under pressure from such mix, and hardening the resinous bond by heating.

8. In the manufacture of abrasive articles, the steps comprising mixing abrasive grain with a heat-hardening liquid resin so as to wet the grain, then mixing the thus wetted grain with a dry powdered heat-hardening partial reaction product resin, the liquid and dry resins being so proportioned as to give a loose readily pourable abrasive mix, forming the article under pressure from such mix, and hardening the resinous bond by heating.

9. The method of making a synthetic resin bonded abrasive article which consists in coating abrasive granules with a liquid synthetic resin, in then coating the thus resin coated granules with a pulverized synthetic resin solid at room temperatures and fusible at elevated temperatures, both coatings producing a resin bond for the abrasive granules, in so proportioning the coatings and granules as to provide a relatively loose and granular mixture capable of cohesion when compacted, in compacting the mass formed and fusing and hardening the bond by heating.

10. An abrasive article consisting of uniformly distributed abrasive granules bonded together with a synthetic resin, the separate abrasive granules being coated with a film of synthetic resin bond formed by the fusion and hardening of a coating of liquid synthetic resin and an added coating of pulverized and fusible synthetic resin.

11. In the process of making abrasive articles, the step which comprises bonding abrasive grains with a resinous bonding material formed from a potentially reactive liquid synthetic resin and fusible solid synthetic resin.

12. In the manufacture of abrasive articles, the steps comprising mixing abrasive grains with a liquid reactive resin and a powdered solid reactive resin to make a workable mix, forming the article from the mix, and hardening the resinous bond.

13. An abrasive article having the abrasive granules thereof bonded with the resinous reaction product formed by the reacting and hardening of a bonding material containing a liquid reactive resin and a solid reactive resin.

14. In the manufacture of abrasive articles the steps comprising mixing abrasive grain with a liquid reactive resin and a dry powdered solid fusible resin, forming the article from the mix and heating the article.

15. An abrasive article comprising abrasive grain bonded with a resinous bond comprising the reaction product obtained by heating a liquid reactive resin and a powdered solid fusible resin.

16. An abrasive article comprising abrasive granules and a bond therefor comprising a hardened urea condensation product.

NORMAN P. ROBIE.